(12) United States Patent
Labat et al.

(10) Patent No.: US 8,984,121 B1
(45) Date of Patent: Mar. 17, 2015

(54) DEPENDENCY VISUALIZATION AND FAULT DIAGNOSIS USING MULTIDIMENSIONAL MODELS FOR SOFTWARE OFFERINGS

(75) Inventors: Jerome Labat, San Carlos, CA (US); Ramkumar Venkataraman, Foster City, CA (US); John Eugene Edward, Fremont, CA (US); Ramachandran Varadharajan, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 335 days.

(21) Appl. No.: 13/091,992

(22) Filed: Apr. 21, 2011

(51) Int. Cl.
*G06F 15/173* (2006.01)

(52) U.S. Cl.
USPC .......................... 709/224; 707/769; 707/797

(58) Field of Classification Search
USPC .................................. 709/224; 707/769, 797
See application file for complete search history.

(56) References Cited

U.S. PATENT DOCUMENTS

| | | | |
|---|---|---|---|
| 7,043,481 B2 * | 5/2006 | Mullins et al. | 1/1 |
| 7,089,566 B1 * | 8/2006 | Johnson | 719/328 |
| 2005/0166094 A1 * | 7/2005 | Blackwell et al. | 714/38 |
| 2007/0055647 A1 * | 3/2007 | Mullins et al. | 707/2 |
| 2008/0052719 A1 * | 2/2008 | Briscoe et al. | 718/104 |
| 2008/0261593 A1 * | 10/2008 | Wong et al. | 455/435.1 |
| 2011/0055817 A1 * | 3/2011 | Noble et al. | 717/127 |
| 2011/0270870 A1 * | 11/2011 | Dettinger et al. | 707/769 |

* cited by examiner

*Primary Examiner* — Thomas Dailey
(74) *Attorney, Agent, or Firm* — Park, Vaughan, Fleming & Dowler LLP; Chia-Hsin Suen (57) ABSTRACT

The disclosed embodiments provide a system that facilitates the maintenance and execution of a software offering. During operation, the system obtains model data associated with a multidimensional model of the software offering. Next, the system displays the model data to a user as a set of dependency mappings among a set of service components and a set of resources used by the software offering. Finally, the system facilitates management of the software offering through the displayed model data.

18 Claims, 10 Drawing Sheets

DEPENDENCY VISUALIZATION AND FAULT DIAGNOSIS USING MULTIDIMENSIONAL MODELS FOR SOFTWARE OFFERINGS

RELATED APPLICATION

The subject matter of this application is related to the subject matter in a co-pending non-provisional application by inventors Jerome Labat, Ramachandran Varadharajan, Wilson W. Lau, and Thomas C. Bishop, entitled "Multidimensional Modeling of Software Offerings," having Ser. No. 13/031,950, and filed on 22 Feb. 2011.

The subject matter of this application is also related to the subject matter in a co-pending non-provisional application by inventors Jerome Labat, Ramachandran Varadharajan, Wilson W. Lau, and Thomas C. Bishop, entitled "Automatic Provisioning of Resources to Software Offerings," having Ser. No. 13/031,968, and filed on 22 Feb. 2011.

BACKGROUND

Related Art

The present embodiments relate to techniques for managing software offerings. More specifically, the present embodiments relate to techniques for providing dependency visualization and cognitive discovery using multidimensional models for the software offerings.

Recent computing trends have shifted the processing and consumption of data and services to cloud computing systems. Such cloud computing systems allow software providers to deploy, execute, and manage software offerings on shared infrastructure resources such as servers, network equipment, platform-virtualization software, and/or datacenter space. Furthermore, such resources may be dynamically provisioned and/or scaled, thus enabling consumption of the resources as services.

For example, a cloud computing provider may provide virtualized storage, network, and/or computing resources to multiple cloud computing customers. The cloud computing customers may deploy software offerings on the virtualized resources and pay the cloud computing provider only for resources consumed by the software offerings. As a result, the cloud computing customers may avoid capital expenditures associated with purchasing, setting up, and/or managing the underlying hardware and software. Furthermore, the centralization and sharing of infrastructure resources may improve the resources' utilization rates and management overhead.

Hence, the deployment, execution, and management of software offerings may be facilitated by mechanisms for dynamically allocating, configuring, and monitoring infrastructure resources used by the software offerings.

SUMMARY

The disclosed embodiments provide a system that facilitates the maintenance and execution of a software offering. During operation, the system obtains model data associated with a multidimensional model of the software offering. Next, the system displays the model data to a user as a set of dependency mappings among a set of service components and a set of resources used by the software offering. Finally, the system facilitates management of the software offering through the displayed model data.

In some embodiments, the system also obtains an update to the multidimensional model, and modifies the displayed model data based on the update.

In some embodiments, the model data is displayed using at least one of a graph and a tree.

In some embodiments, the graph includes a set of nodes representing the service components and the resources, and a set of connections corresponding to the dependency mappings.

In some embodiments, the tree includes a root node and a hierarchy of subnodes corresponding to dependencies of the root node.

In some embodiments, facilitating management of the software offering through the displayed model data involves at least one of providing multiple views of the model data to the user, and facilitating fault diagnosis using the displayed model data.

In some embodiments, providing multiple views of the model data to the user involves at least one of:
  (i) displaying multiple levels of dependencies among the service components and the resources;
  (ii) applying one or more filters to the displayed model data; and
  (iii) enabling display of the dependency mappings around different root nodes.

In some embodiments, facilitating fault diagnosis using the displayed model data involves indicating faults associated with the software offering within the displayed model data, and enabling traversal of the dependency mappings along the indicated faults.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the maintenance and execution of a software offering. The software offering may correspond to an application that is deployed on one or more servers and accessed over a network connection. For example, the software offering may provide a web application, distributed application, and/or web service to users of the software offering.

More specifically, the disclosed embodiments provide a method and system for displaying model data associated with a multidimensional model of the software offering to a user such as an administrator of the software offering. The multidimensional model may include a set of service components in the software offering, a set of resources used by the software offering, and a set of dependencies among the service components and/or resources. The multidimensional model may thus facilitate the deployment, execution, and maintenance of the software offering.

Furthermore, the model data may be displayed as a set of dependency mappings among a set of service components and a set of resources used by the software offering. For example, the model data may be displayed within a graph containing a set of nodes representing the service components and resources and a set of connections corresponding to the dependency mappings. Alternatively, the model data may be displayed within a tree containing a root node and a hierarchy of subnodes corresponding to dependencies of the root node.

In turn, the displayed model data may facilitate management of the software offering. First, multiple views of the model data may be provided to the user to improve the user's understanding of service components, resources, and dependencies in the software offering and thus enable the user to better manage the deployment, execution, and maintenance of the software offering. Second, the displayed model data may facilitate fault diagnosis by indicating faults associated with the software offering within the displayed model data and enabling traversal of the dependency mappings along the indicated faults. Consequently, the disclosed embodiments may increase use of the multidimensional model in managing the software offering across the software development lifecycle of the software offering.

Figure 1:
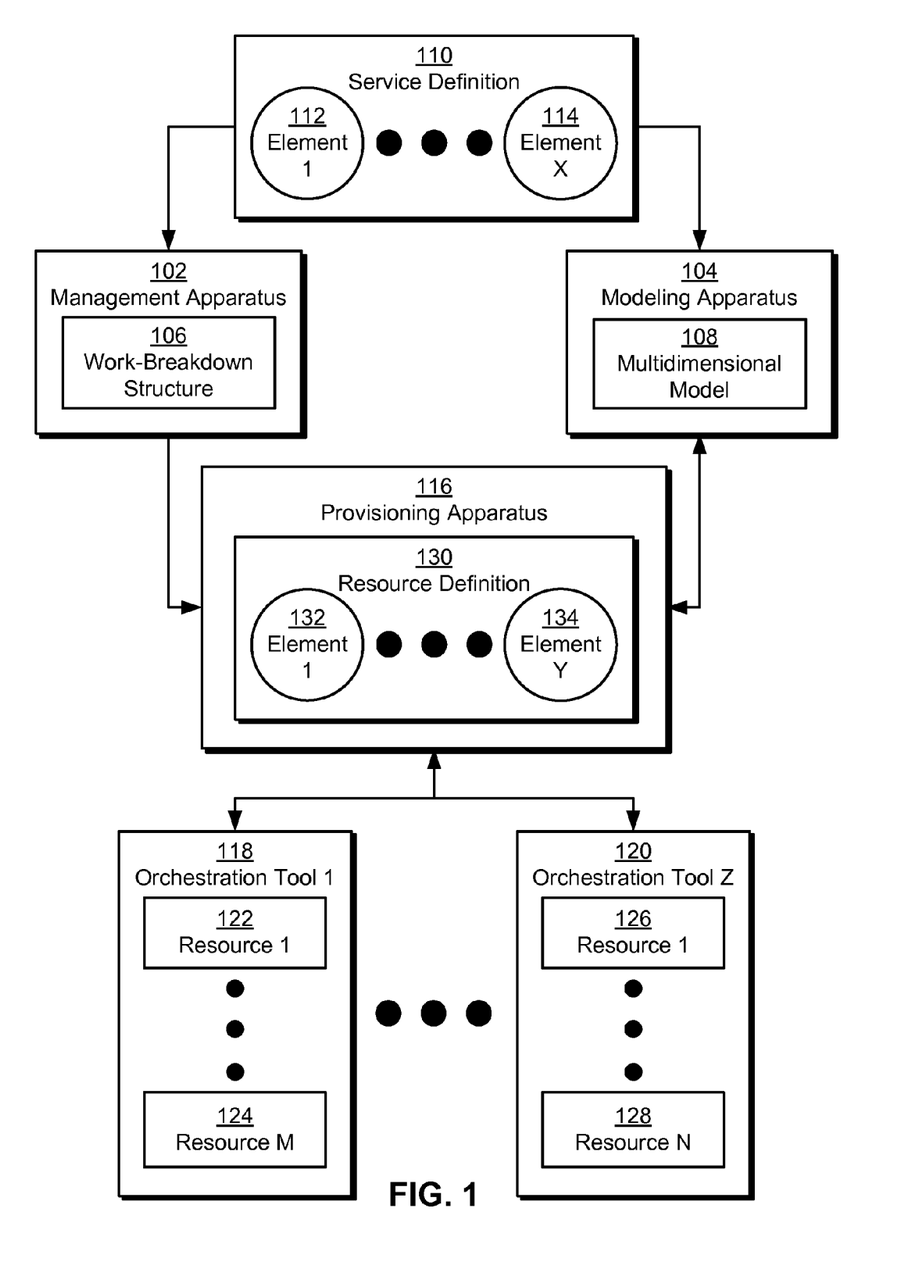
FIG. 1 shows a schematic of a system in accordance with an embodiment.

FIG. 1 shows a schematic of a system in accordance with an embodiment. As shown in FIG. 1, the system includes a management apparatus 102, a modeling apparatus 104, and a provisioning apparatus 116. Each of these components is discussed in further detail below.

In one or more embodiments, the system of FIG. 1 is used to manage the deployment and execution of a software offering on a set of resources (e.g., resource 1 122, resource m 124, resource 1 126, resource n 128). The software offering may correspond to a software program that performs tasks for a set of users. For example, the software offering may allow the users to collaborate on projects, file income taxes, manage personal or small business finances, and/or perform data mining on a target data set.

Furthermore, the software offering may be implemented using a client-server architecture. Components of the software offering may be deployed and executed on one or more servers (e.g., in a data center) and accessed from other machines using a locally installed executable, a command-line interface, and/or a web browser and network connection. In other words, the software offering may be implemented using a cloud computing system that is accessed over the Internet.

To enable execution of the software offering, users associated with the creation, deployment, and/or execution of the software offering may determine a set of requirements associated with the software offering. The users may then allocate resources (e.g., resource 1 122, resource m 124, resource 1 126, resource n 128) in the cloud computing system to components in the software offering and configure the allocated resources in a way that allows the executing software offering to meet the requirements. For example, a development team for the software offering may provide a policy specifying a level of availability, reliability, scalability, security, and/or response time in the software offering. Administrators for the cloud computing system may ensure compliance with the policy by allocating sufficient infrastructure resources to the software offering and/or configuring the resources to provide requisite levels of redundancy, security, and/or load balancing in the software offering.

Those skilled in the art will appreciate that the cloud computing system may use virtualization to deploy and execute the software offering on a set of shared resources. In particular, a number of orchestration tools (e.g., orchestration tool 1 118, orchestration tool z 120) may be used to virtualize and/or provision different types of resources in the cloud computing system. For example, a virtual machine monitor may allocate and/or manage computing resources by creating and executing virtual machines as abstractions of physical servers. Similarly, a virtual filer may combine storage resources from a variety of storage devices into a resource pool and allocate logical volumes of storage from the resource pool. Finally, network routers and/or switches may partition network resources into virtual local area networks (VLANs) that connect physical and/or virtual computing and/or storage resources in the cloud computing system.

Moreover, each orchestration tool may include functionality to dynamically re-provision resources in response to changes in the software offering and/or in demand for the resources. For example, a virtual machine monitor may instantiate a new virtual machine to enable the addition of a new web server to the software offering. The virtual machine monitor may also allocate a set of physical computing resources (e.g., processor, memory, etc.) to the virtual machine to enable execution of the web server on the resources. Finally, the virtual machine monitor may move the virtual machine to a different set of physical resources if the web server's resource requirements change and/or the physical resources (e.g., servers) used to execute the web server become overloaded.

In other words, the use of resources by the software offering may be managed by a number of disparate, independently acting orchestration tools. As a result, the cloud computing system may lack a comprehensive view of dependencies between software components in the software offering and the hardware resources used to execute the software components. For example, the cloud computing system may lose track of resources allocated to the software offering once the orchestration tools begin reallocating and/or re-provisioning the resources.

Such lack of dependency information may cause problems with tracking and managing events and/or failures in the cloud computing system. For example, a server outage in the cloud computing system may require manual intervention by administrators to determine the set of hardware and software components affected by the outage and/or perform corrective actions that enable recovery from the server outage.

In one or more embodiments, the system of FIG. 1 reduces complexity associated with managing requirements and dependencies in the software offering by creating a multidimensional model 108 of the software offering and using multidimensional model 108 to manage the deployment and execution of the software offering. As shown in FIG. 1, multidimensional model 108 may be created from a service definition 110 of the software offering and a resource definition 130 of resources available for use by the software offering.

Service definition 110 may be obtained from a user (e.g., developer, architect, etc.) associated with the creation and/or development of the software offering. More specifically, service definition 110 may correspond to a logical representation of the software offering in terms of the software offering's configuration, topology, policies, and/or QoS attributes. As a result, elements (e.g., element 1 112, element x 114) of service definition 110 may include one or more tiers, a set of service components, and/or a set of connections. For example, an architect of the software offering may provide service definition 110 by inputting the number of tiers, level of security, software-development-lifecycle stage, and/or software stack associated with the software offering into a user interface provided by management apparatus 102.

On the other hand, resource definition 130 may be obtained from administrators and/or orchestration tools of the cloud computing system and correspond to a logical representation and/or division of available infrastructure resources in the cloud computing system in terms of the resources' locations, states, and/or utilization. Elements (e.g., element 1 132, element y 134) of resource definition 130 may thus represent physical and/or virtual resources, resource clusters, security zones, hosting segments, and/or locations in the cloud computing system. For example, an administrator may manually populate resource definition 130 with an inventory of physical and/or virtual resources in the cloud computing system, or provisioning apparatus 116 may receive notifications of changes to resources (e.g., addition of new resources, removal of existing resources) in the cloud computing system from the orchestration tools (e.g., virtual machine monitors, virtual filers) and update resource definition 130 accordingly.

To create multidimensional model 108, modeling apparatus 104 may map a first set of elements (e.g., element 1 112, element x 114) from service definition 110 to a second set of elements (e.g., element 1 132, element y 134) from resource definition 130. The mappings may represent dependencies of the first set of elements on the second set of elements. For example, a mapping from a service component in service definition 110 to a resource in resource definition 130 may indicate the allocation of the resource to the service component by an orchestration tool. Creation of multidimensional models for software offerings is discussed in a co-pending non-provisional application by inventors Jerome Labat, Ramachandran Varadharajan, Wilson Lau, and Thomas Bishop, entitled "Multidimensional Modeling of Software Offerings," having Ser. No. 13/031,950, and filed on 22 Feb. 2011, which is incorporated herein by reference.

In one or more embodiments, the creation of multidimensional model 108 involves the identification of a set of requirements associated with the software offering from service definition 110, as well as the subsequent allocation of a subset of the resources from resource definition 130 to service components in service definition 110 based on the requirements. In particular, management apparatus 102 may determine the software offering's requirements from a set of policies in service definition 110 and store the requirements in a work-breakdown structure 106. The policies may include a software-development-lifecycle policy, a security policy, a software-template policy, a QoS policy, and/or a structural policy. The requirements may thus specify the amount and/or configuration of resources required to satisfy the policies.

Next, provisioning apparatus 116 may use work-breakdown structure 106 to automatically provision a set of resources for use by the software offering without requiring manual configuration of the resources by a user (e.g., administrator). For example, provisioning apparatus 116 may use work-breakdown structure 106 to create a set of service containers for hosting the software offering. Provisioning apparatus 116 may then allocate resources to the service containers by requesting the required amounts and/or configurations of resources from the corresponding orchestration tools. Automatic provisioning of resources to software offerings is discussed in a co-pending non-provisional application by inventors Jerome Labat, Ramachandran Varadharajan, Wilson Lau, and Thomas Bishop, entitled "Automatic Provisioning of Resources to Software Offerings," having Ser. No. 13/031,968, and filed on 22 Feb. 2011, which is incorporated herein by reference.

As mentioned previously, multidimensional model 108 may include dependencies between service components in service definition 110 and resources in resource definition 130. Consequently, modeling apparatus 104 may create multidimensional model 108 by mapping resources allocated by provisioning apparatus 116 to the service components to which the resources were allocated.

Modeling apparatus 104 may also update the mappings based on changes to the provisioned resources. For example, resources provisioned to service components may change as the orchestration tools allocate new resources, deallocate currently allocated resources, and/or use different sets of physical resources to execute virtualized resources (e.g., virtual machines, logical volumes, VLANs, etc.). Such changes may be obtained by provisioning apparatus 116 through querying and/or monitoring of the orchestration tools. The changes may also be used by provisioning apparatus 116 to update resource definition 130. The updates may then be propagated to multidimensional model 108 via modeling apparatus 104.

Because multidimensional model 108 contains an up-to-date representation of service components, resources, and dependencies in the software offering, the system of FIG. 1 may facilitate management of the software offering within the cloud computing system. For example, multidimensional model 108 may facilitate the automatic deployment of the software offering on the allocated resources, identification of resources allocated to the software offering, identification of failures during execution of the software offering, and/or management of changes associated with the software offering or the resources. In other words, the creation and update of multidimensional model 108 may reduce complexity and/or overhead associated with configuration management, fault diagnosis and remediation, deployment, and/or resource provisioning in the software offering.

In one or more embodiments, the system of FIG. 1 further facilitates use of multidimensional model 108 in managing the software offering by providing a visualization of multidimensional model 108 to a user such as an administrator of the software offering. First, model data associated with multidimensional model 108 may be obtained from modeling apparatus 104. The model data may then be displayed to the user as a set of dependency mappings among the service components in service definition 110 and resources in resource definition 130. For example, the model data may be displayed as a graph and/or a tree within a graphical user interface (GUI) provided by management apparatus 102 and/or another component of the system.

In addition, updates to multidimensional model 108 may be used to modify the displayed model data so that the displayed model data contains an up-to-date representation of dependencies in the software offering. In particular, provisioning apparatus 116 may obtain execution data for the software offering from one or more of the orchestration tools and update multidimensional model 108 (e.g., using modeling apparatus 104) based on the execution data. For example, provisioning apparatus 116 may use execution data associated with a change in a number of service containers allocated to the software offering, a resizing of a service container allocated to the software offering, and/or a relocation of the service container to update resource definition 130. The updates may be used by modeling apparatus 104 to change the mappings between elements of multidimensional model 108. The changes may then be obtained by management apparatus 102 and used to update the displayed model data accordingly.

The displayed model data may also be used to facilitate management of the software offering. First, multiple views of the model data may allow the user to better manage the software offering by improving the user's understanding of service components, resources, and dependencies in the software offering. Second, the displayed model data may facilitate fault diagnosis by indicating faults associated with the software offering within the displayed model data and enabling traversal of the dependency mappings along the indicated faults. Consequently, the disclosed embodiments may increase use of multidimensional model 108 in managing the software offering across the software development lifecycle of the software offering. Display of model data associated with multidimensional model 108 is discussed in further detail below with respect to FIG. 2.

Figure 2:
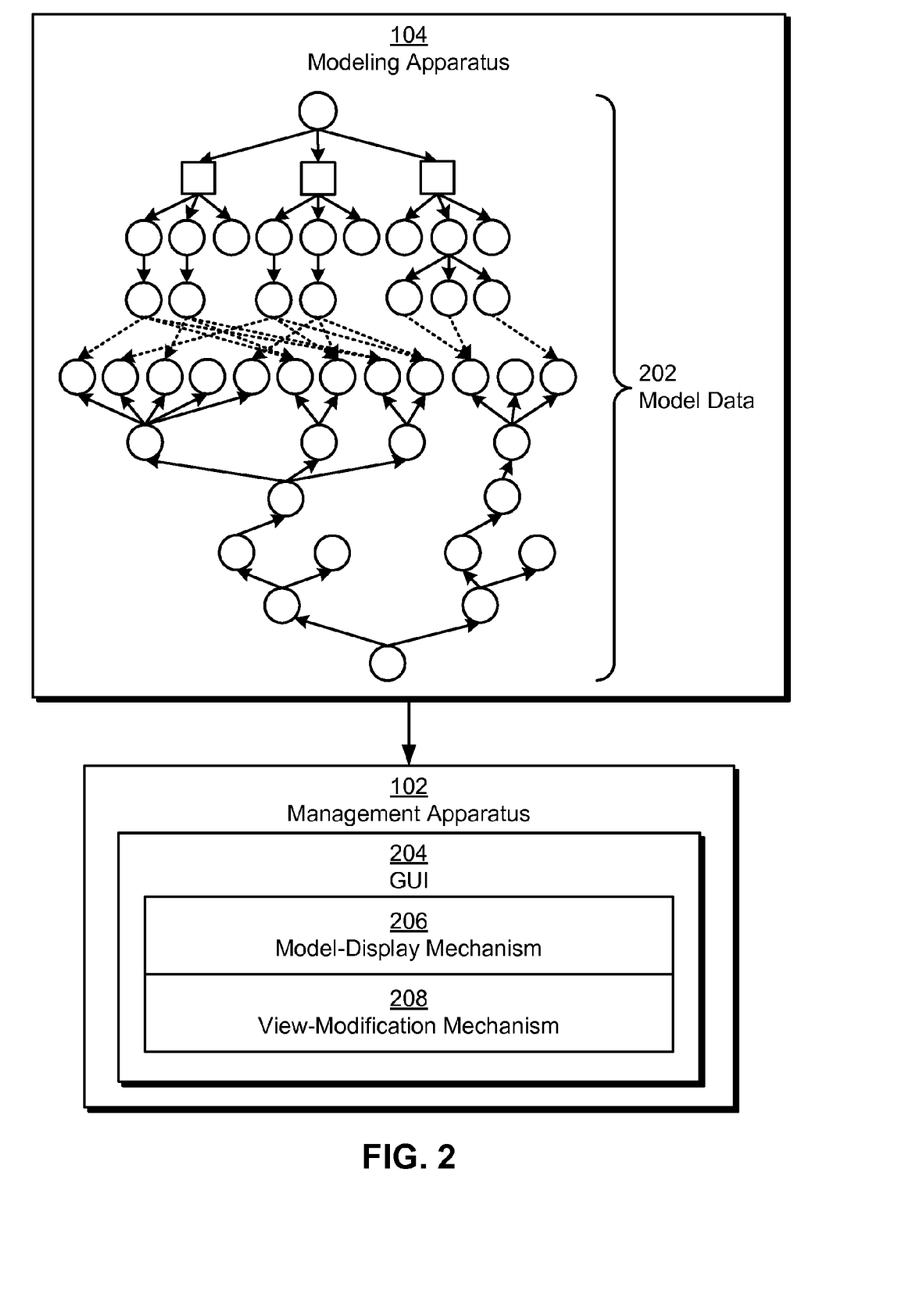
FIG. 2 shows a system for displaying model data associated with a multidimensional model of a software offering to a user in accordance with an embodiment.

FIG. 2 shows a system for displaying model data 202 associated with a multidimensional model (e.g., multidimensional model 108 of FIG. 1) of a software offering to a user in accordance with an embodiment. Model data 202 may be provided by modeling apparatus 104 as an up-to-date representation of service components, resources, and dependencies in the software offering.

Model data 202 may then be displayed as a set of dependency mappings among service components and resources used by the software offering within a GUI 204 provided by management apparatus 102. In particular, management apparatus 102 may display model data 202 using a graph and/or a tree. The tree may contain a root node and a hierarchy of subnodes corresponding to dependencies of the root node. For example, the root node may represent the software offering, the subnodes may depict the service components and resources associated with the software offering, and the hierarchy of the subnodes may represent the dependencies among the service components and resources. Display of model data 202 using a tree is discussed in further detail below with respect to FIG. 3.

On the other hand, the graph may include a set of nodes representing the service components and the resources and a set of connections corresponding to the dependency mappings. For example, nodes in the graph may represent the software offering; the project to which the software offering belongs; web servers, application servers, databases, and/or other service components associated with the software offering; and physical and/or virtualized resources on which the service components execute. A connection between a pair of nodes may thus represent a dependency mapping between the corresponding service components and/or resources. Display of model data 202 using a graph is discussed in further detail below with respect to FIGS. 4A-4C.

As mentioned above, the display of model data 202 within GUI 204 may facilitate management of the software offering. In particular, a model-display mechanism 206 in GUI 204 may provide multiple views of model data 202 to the user, and a view-modification mechanism 208 in GUI 204 may provide user-interface elements that allow the user to change the view provided by model-display mechanism 206.

First, the views may include the display of multiple levels of dependencies among the service components and the resources. For example, view-modification mechanism 208 may provide a slider element that allows the user to select a numeric level of dependency associated with the displayed model data 202. In turn, model-display mechanism 206 may display only the nodes that are separated from the root node by a number of dependency mappings that is less than or equal to the user-specified level of dependency. Display of multiple levels of dependencies in model data 202 is discussed in further detail below with respect to FIGS. 4A-4C.

The views may also include the application of one or more filters to the displayed model data 202. For example, view-modification mechanism 208 may include a list of checkboxes representing different types of nodes in the displayed model data 202. If the user selects a checkbox, the corresponding type of node (e.g., resource, service component, etc.) is shown in model-display mechanism 206. Applying filters to displayed model data 202 is discussed in further detail below with respect to FIG. 5.

Finally, the views may enable the display of the dependency mappings around different root nodes. For example, view-modification mechanism 208 may allow the user to select a node as the root node in the displayed model data 202 by double-clicking an icon corresponding to the node. Model-display mechanism 206 may then re-render the displayed model data 202 with the selected node as the root node.

Model-display mechanism 206 and view-modification mechanism 208 may additionally facilitate fault diagnosis using the displayed model data 202. For example, model-display mechanism 206 may indicate faults associated with the software offering within the displayed model data 202, and view-modification mechanism 208 may enable traversal of the dependency mappings along the indicated faults. Fault diagnosis using displayed model data 202 is discussed in further detail below with respect to FIG. 6.

Figure 3:
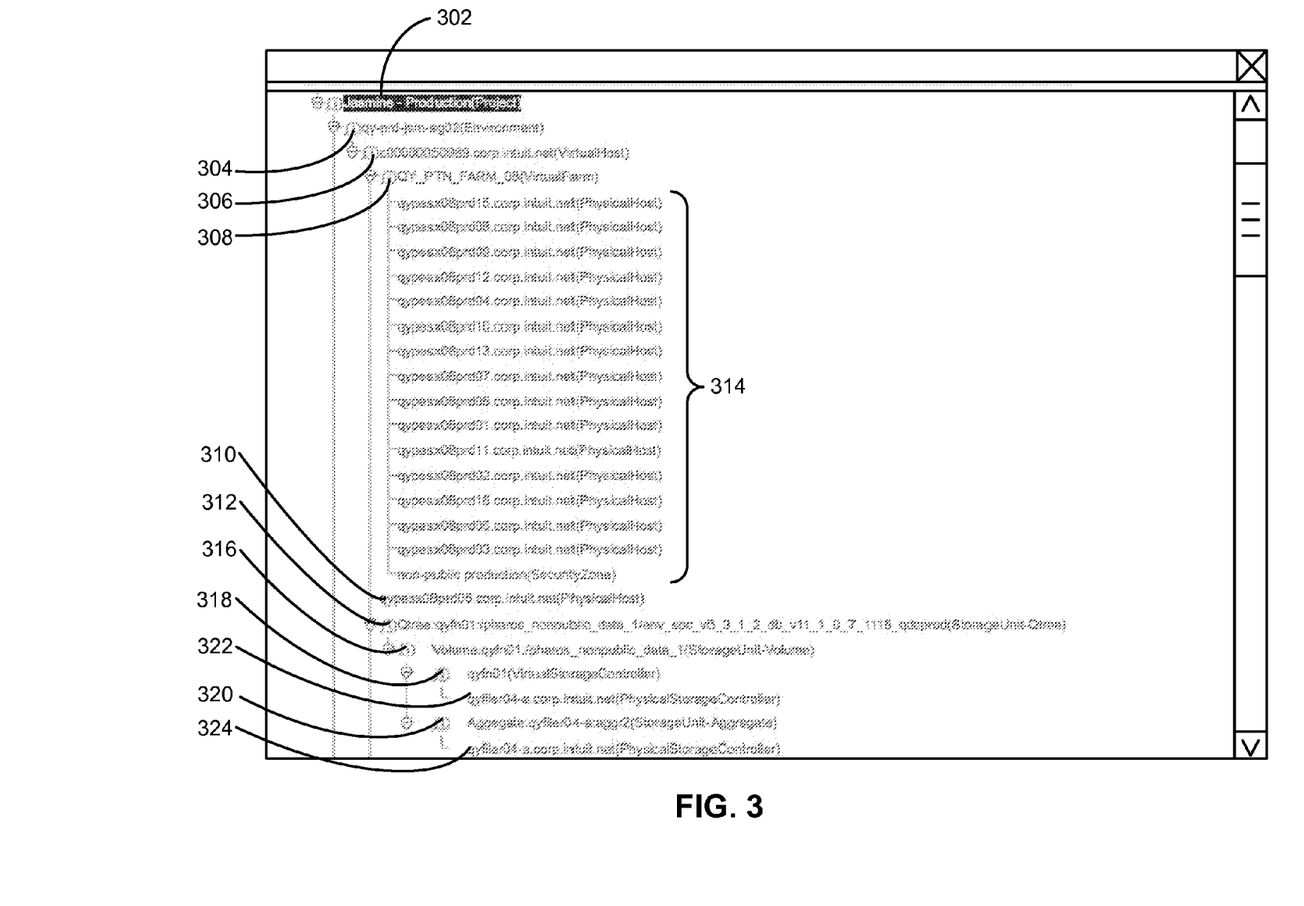
FIG. 3 shows an exemplary screenshot in accordance with an embodiment.

FIG. 3 shows an exemplary screenshot in accordance with an embodiment. More specifically, FIG. 3 shows a screenshot of a GUI for displaying model data associated with a multi-dimensional model of a software offering, such as GUI 204 of FIG. 2.

As shown in FIG. 3, the model data is displayed using a tree. The tree includes a root node 302 (e.g., "Project") representing a project to which the software offering belongs, as well as a hierarchy of subnodes 304-324 representing dependencies of the project. In other words, the GUI of FIG. 3 may provide a structured view of dependencies in the software offering, with root node 302 as the node of interest from which dependencies are obtained and/or displayed.

First, node 304 (e.g., "Environment") may be a child node of root node 302. As a result, node 304 may indicate a dependency of the project represented by root node 302 on the execution environment for the project. Next, node 306 (e.g., "VirtualHost") may be a child node of node 304, indicating a dependency of the execution environment on a virtual machine.

Child nodes of node 306 may include nodes 308-312 (e.g., "VirtualFarm," "PhysicalHost," "StorageUnit-Qtree"). As a result, the virtual machine may depend on a virtual server farm, a physical host, and a storage volume. Furthermore, node 308 may include a set of child nodes 314 (e.g., "PhysicalHost," "SecurityZone") representing the dependency of the virtual machine on a number of physical hosts and a non-public production security zone.

Along the same lines, node 316 (e.g., "StorageUnit-Volume") may be a child node of node 312, indicating the dependency of a "Qtree" storage unit on a storage volume. In turn, nodes 318-320 (e.g., "VirtualStorageController," "StorageUnit-Aggregate") may be child nodes of node 316 and represent the dependency of a storage volume on a virtual storage controller and an aggregate storage unit. Finally, nodes 322-324 (e.g., "PhysicalStorageController") may be child nodes of nodes 318-320, respectively, thus specifying the dependency of both the virtual storage controller and the aggregate storage unit on the same physical storage controller.

The GUI of FIG. 3 may additionally facilitate management of the software offering through the displayed data by providing multiple views of the displayed model data. For example, a user of the GUI may view different levels of dependencies within the software offering by expanding and/or collapsing the display of subnodes under a particular node 302-324 in the tree. Such viewing of different levels of dependencies may improve the user's knowledge of the arrangement and use of service components and resources in the software offering, thus enabling the user to make informed decisions regarding the management of the software offering.

Likewise, events such as faults, outages, and/or scheduled maintenance may be indicated in the tree by highlighting and/or otherwise flagging the nodes affected by the events in the tree. Such indicators of events associated with the software offering may further the user's understanding of dependencies in the software offering and may aid in the diagnosis and remediation of faults in the software offering.

Figure 4A:
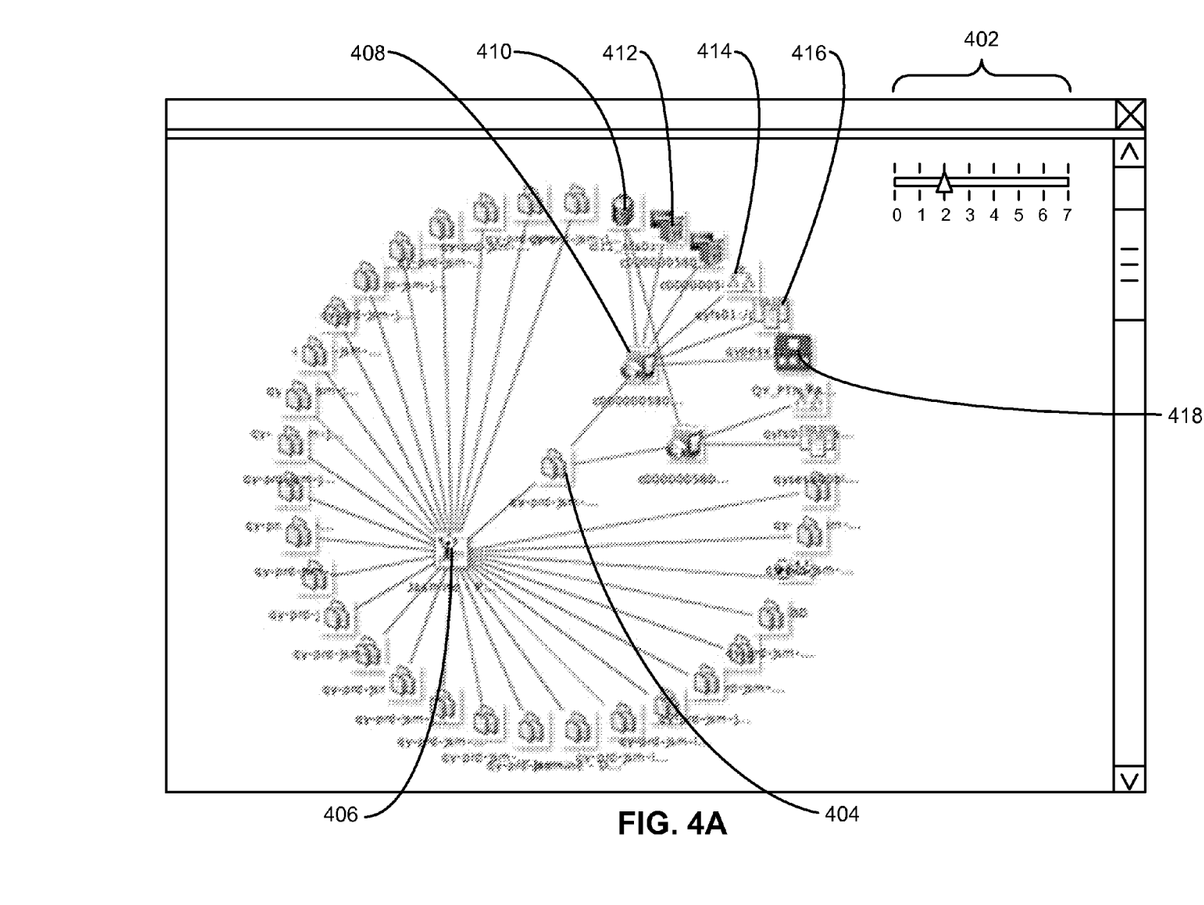
FIG. 4A shows an exemplary screenshot in accordance with an embodiment.

FIG. 4A shows an exemplary screenshot in accordance with an embodiment. As with FIG. 3, the screenshot of FIG. 4A shows a GUI for displaying model data associated with a multidimensional model of a software offering, such as GUI 204 of FIG. 2. However, unlike the GUI of FIG. 3, the GUI of FIG. 4 uses a graph to depict a set of dependency mappings among a set of service components and a set of resources used by the software offering.

In particular, the GUI of FIG. 4A displays a set of nodes, including nodes 404-418, as well as a set of connections between pairs of nodes. As described above, the nodes may represent the service components and/or resources, and the connections may correspond to the dependency mappings. For example, node 404 may represent the execution environment of the software offering, node 406 may represent the project to which the software offering belongs, node 408 may represent a virtual machine used by the software offering, and node 410 may represent a local storage array. Similarly, node 412 may represent a network interface card (NIC) used by the virtual machine, node 414 may represent network storage attached to the virtual machine, node 416 may represent a physical host on which the virtual machine executes, and node 418 may represent a resource cluster to which the virtual machine belongs.

Moreover, the graph includes a root node representing the software offering, or node 404, as well as a view-modification mechanism (e.g., view-modification mechanism 208 of FIG. 2) that allows a user to select a level of dependency among the service components and resources shown in the graph by interacting with a slider element 402. The level of dependency may represent the maximum number of dependency mappings separating the root node from another node in the displayed model data. Because slider element 402 is set to "2," the GUI of FIG. 4A may show only nodes that are at most two dependencies away from the root node.

The user may also change the view of the model data by specifying a different root node around which dependencies are displayed. For example, the view-modification mechanism may allow the user to double-click on node 408, provide a keyboard shortcut, and/or use another input mechanism to specify node 408 as the root node of the graph. Once a new root node is established, other nodes in the graph may be displayed based on the number of dependency mappings separating the new root node from the other nodes. For example, the selection of node 408 as the new root node may cause the graph to display nodes that are up to two dependencies away from node 408.

Finally, the view-modification mechanism may rearrange the display of nodes and connections in the graph based on input from the user. For example, the user may drag nodes 404-418 and/or other nodes around the GUI to obtain a better view of dependency mappings among the nodes. Alternatively, the user may interact with a three-dimensional (3D) version of the graph by zooming in and out of concentric spheres of nodes representing different levels of dependencies in the software offering and/or rotating the graph to view all nodes along the surface of a given sphere or level.

Figure 4B:
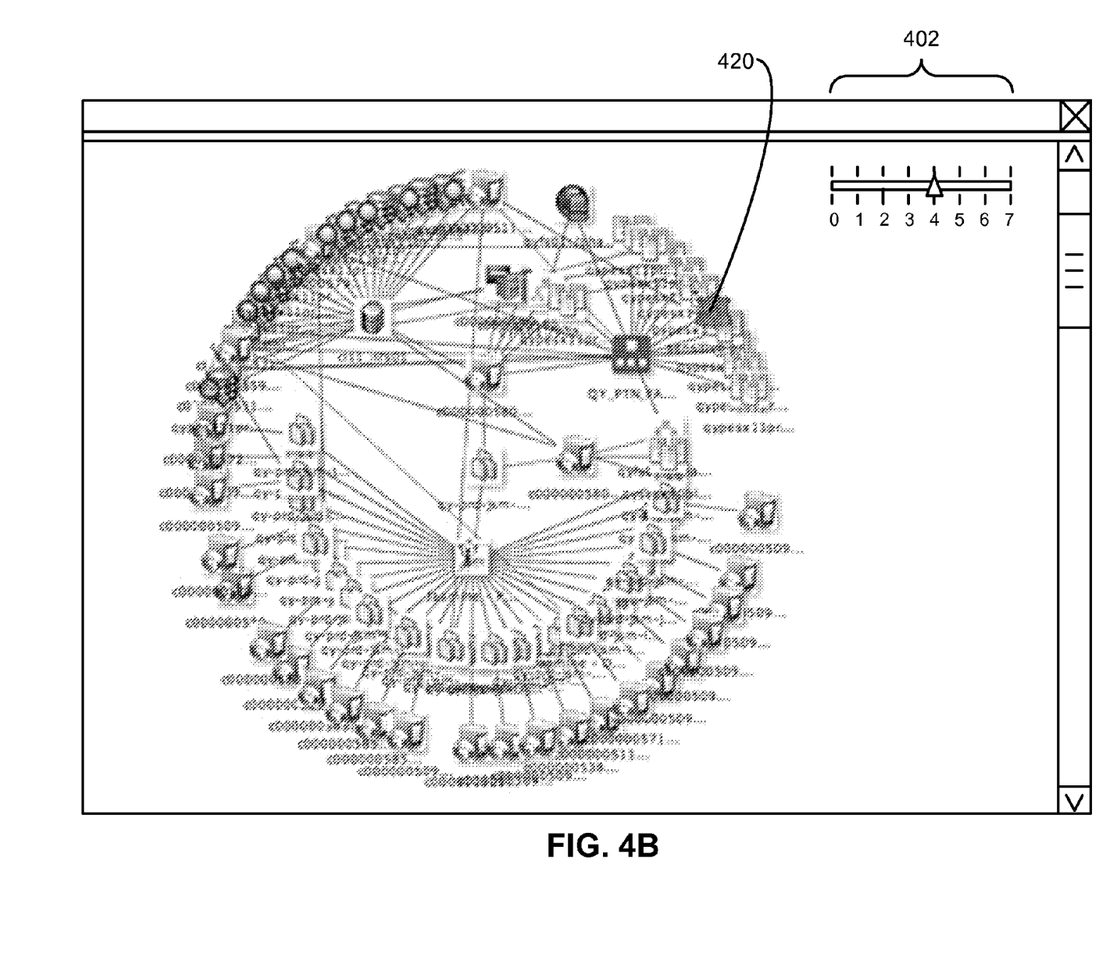
FIG. 4B shows an exemplary screenshot in accordance with an embodiment.

FIG. 4B shows an exemplary screenshot in accordance with an embodiment. More specifically, FIG. 4B shows the GUI of FIG. 4A with a different level of dependency displayed in the model data. As shown in FIG. 4B, slider element 402 is set to "4," indicating that the displayed model data contains nodes that are up to four dependency mappings away from the root node. Consequently, the graph of FIG. 4B includes all of the nodes in the graph of FIG. 4A, as well as nodes that are up to two dependency mappings away from the nodes of FIG. 4A. For example, the graph of FIG. 4B may include a node 420 representing a security zone on which some of the nodes in FIG. 4A have a dependency.

Figure 4C:
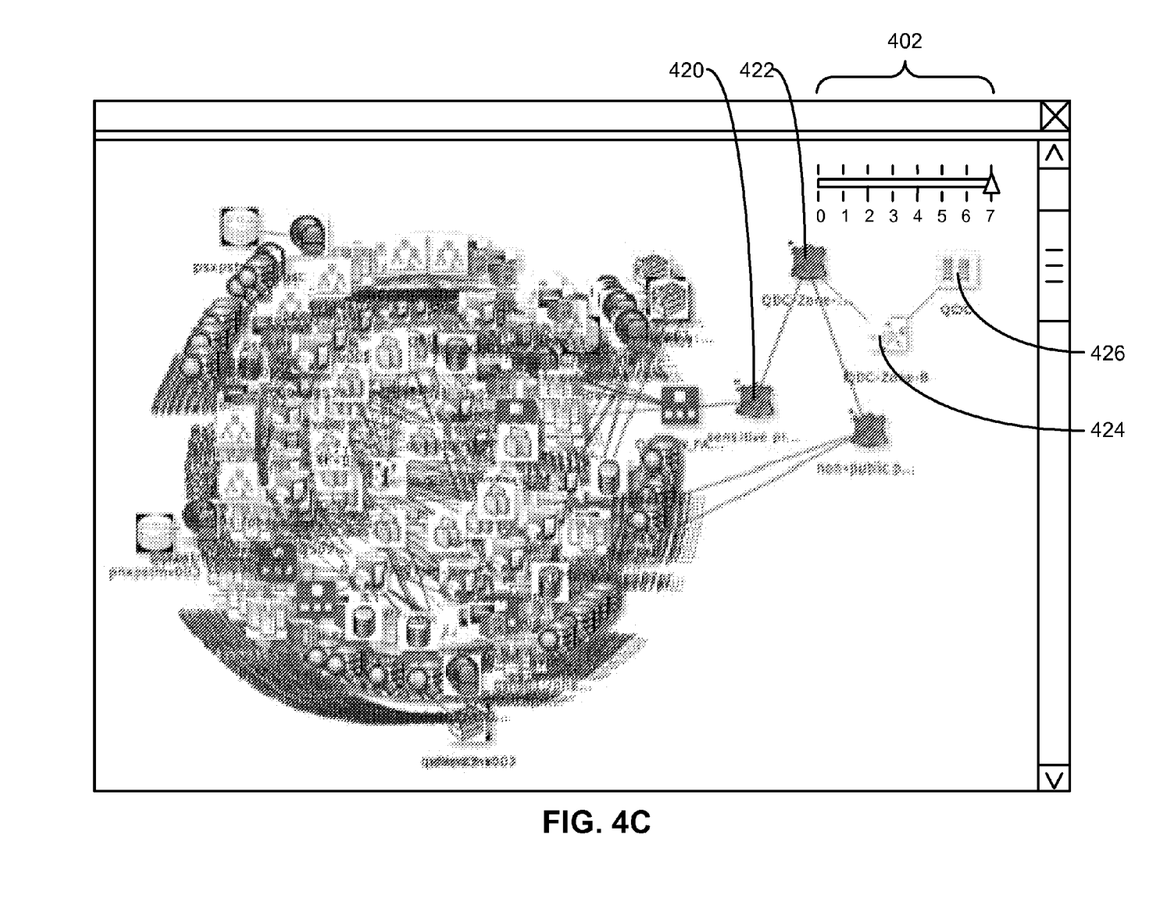
FIG. 4C shows an exemplary screenshot in accordance with an embodiment.

FIG. 4C shows an exemplary screenshot in accordance with an embodiment. The screenshot of FIG. 4C may correspond to the GUIs of FIGS. 4A-4B with a different level of dependency displayed in the model data. Within FIG. 4C, slider element 402 is set to "7," indicating that the displayed model data contains nodes that are up to the maximum of seven dependency mappings away from the root node. Conversely, if a node can be separated from the root node by more than seven dependency mappings, the view-modification mechanism may allow the user to specify additional levels of dependencies using slider element 402 and/or another user-interface element such as a form field or drop-down menu.

As shown in FIG. 4C, the displayed model data contains three levels of dependencies from node 420 to other nodes 422-426 in the graph. For example, the connection from node 420 to node 422 may indicate a dependency of a first security zone on a second security zone. Next, the connection from node 422 to node 424 may represent a dependency of the second security zone on a hosting segment. Finally, the connection from node 424 to node 426 may specify a dependency of the hosting segment on a data center. In other words, connections between nodes in the graph may reflect the direct and/or indirect allocation of physical resources to service components in the software offering, thus facilitating the management of dependencies in the software offering by the user.

Figure 5:
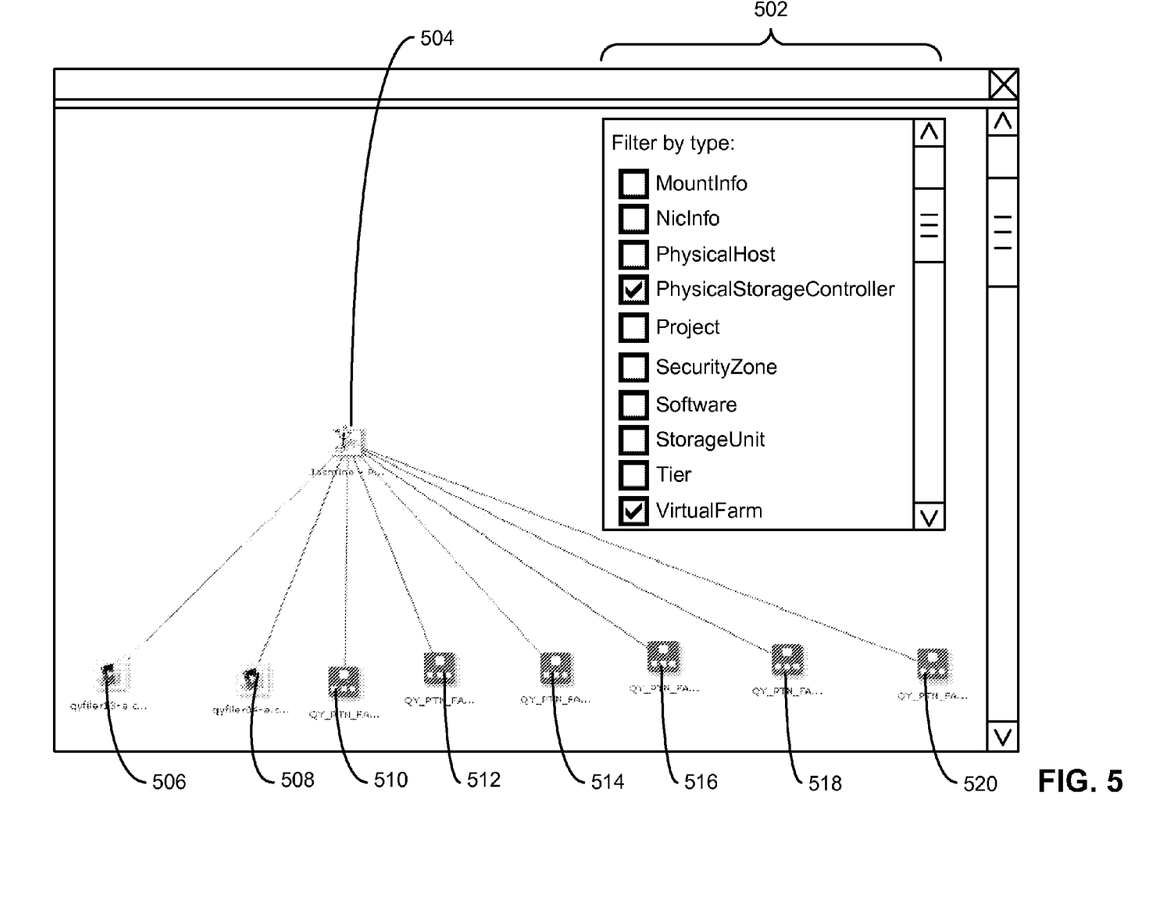
FIG. 5 shows an exemplary screenshot in accordance with an embodiment.

FIG. 5 shows an exemplary screenshot in accordance with an embodiment. More specifically, FIG. 5 shows a screenshot of a GUI for displaying model data associated with a multidimensional model of a software offering, such as GUI 204 of FIG. 2. Like the GUI of FIGS. 4A-4C, the GUI of FIG. 5 displays the model data using a graph.

However, the graph shown in FIG. 5 contains fewer nodes 504-520 and/or types of nodes than the graphs of FIGS. 4A-4C because a set of filters has been applied to the displayed model data. As shown in FIG. 5, the filters may be selected and/or deselected using a set of checkboxes 502 provided by a view-modification mechanism, such as view-modification mechanism 208 of FIG. 2. The selection of checkboxes corresponding to "PhysicalStorageController" and "VirtualFarm" may indicate that only nodes 506-520 connected directly or indirectly to a root node 504 and that match the selected checkboxes are displayed in the graph. For example, nodes 506-508 may represent physical storage controllers on which the software offering depends, while nodes 510-520 may represent virtual server farms on which the software depends. Consequently, the filtering shown in FIG. 5 may facilitate the identification of the software offering's dependencies on specific types of resources and/or service components.

Figure 6:
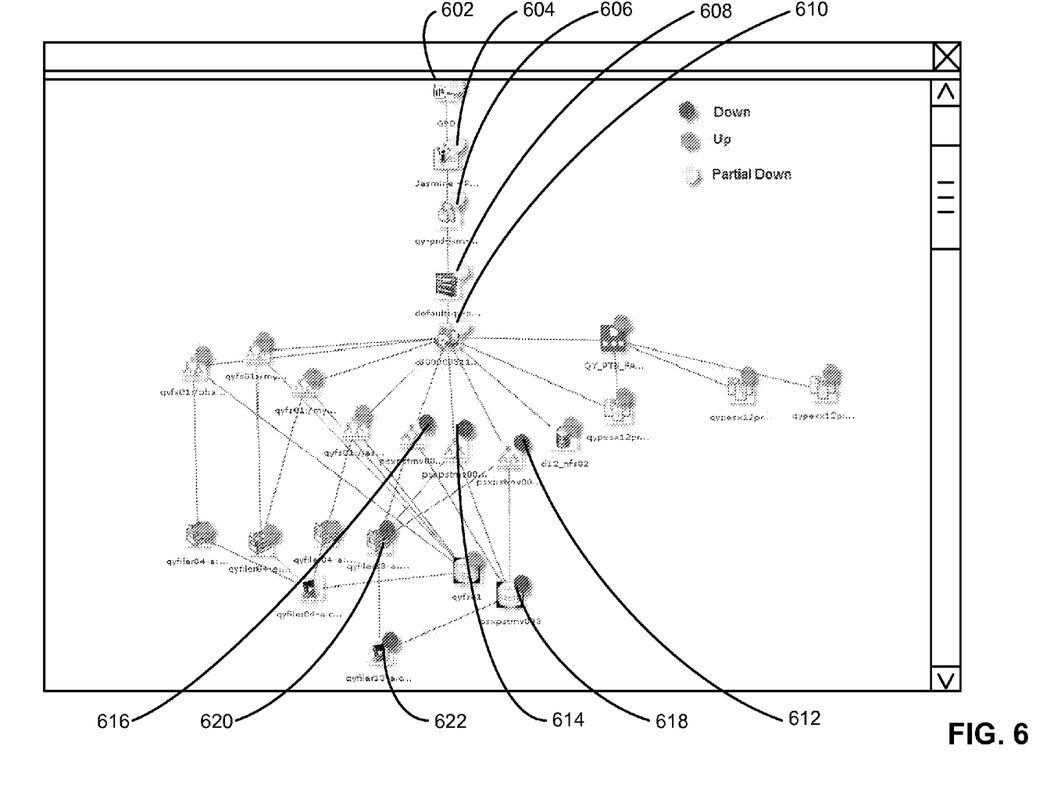
FIG. 6 shows an exemplary screenshot in accordance with an embodiment.

FIG. 6 shows an exemplary screenshot in accordance with an embodiment. The screenshot of FIG. 6 may show the use of a GUI that facilitates fault diagnosis using displayed model data associated with a multidimensional model of a software offering, such as GUI 204 of FIG. 2.

In particular, the screenshot of FIG. 6 shows a graph-based representation of the model data. As discussed above, the graph may contain a set of nodes representing service components and/or resources used by the software offering, including nodes 602-620. Moreover, a set of connections between pairs of nodes may correspond to dependency mappings among the service components and/or resources.

To enable fault diagnosis using the displayed model data, the GUI may indicate faults associated with the software offering within the displayed modeled data. For example, nodes 602-610 may be flagged with a yellow dot to indicate a partial outage in the corresponding service components and/or resources, while nodes 612-622 may be flagged with a red dot to indicate a full outage in the corresponding service components and/or resources. All other nodes in the graph may show a green dot to indicate normal functioning of the corresponding service components and/or resources.

As a result, a user may identify the root cause of one or more outages in the software offering by traversing the dependency mappings along the indicated faults. For example, the user may begin with node 602 as the root node of the graph, then select nodes 604-610 in sequence as the next root nodes by following dependency mappings from one flagged node to the next. Once the user selects node 610 as the root node, the user may encounter nodes 612-622 flagged with red dots and examine the dependency mappings among nodes 612-622 to ascertain the service component and/or resource represented by node 622 as the root cause of the outages associated with nodes 602-622. The GUI of FIG. 6 may thus allow the user to diagnose faults in the software offering much more efficiently and/or intuitively than fault diagnosis methods that require manual examination of individual service components and/or resources in the software offering.

The GUI of FIG. 6 may additionally facilitate fault diagnosis by displaying a history of changes to service components and/or resources represented by nodes 602-622. For example, the user may select a node 602-622 to view a list of changes (e.g., upgrades, patches, versions) associated with the corresponding service component and/or resource. The user may then use the list to correlate a new fault and/or outage in the service component and/or resource with recent changes to the service component and/or resource.

Figure 7:
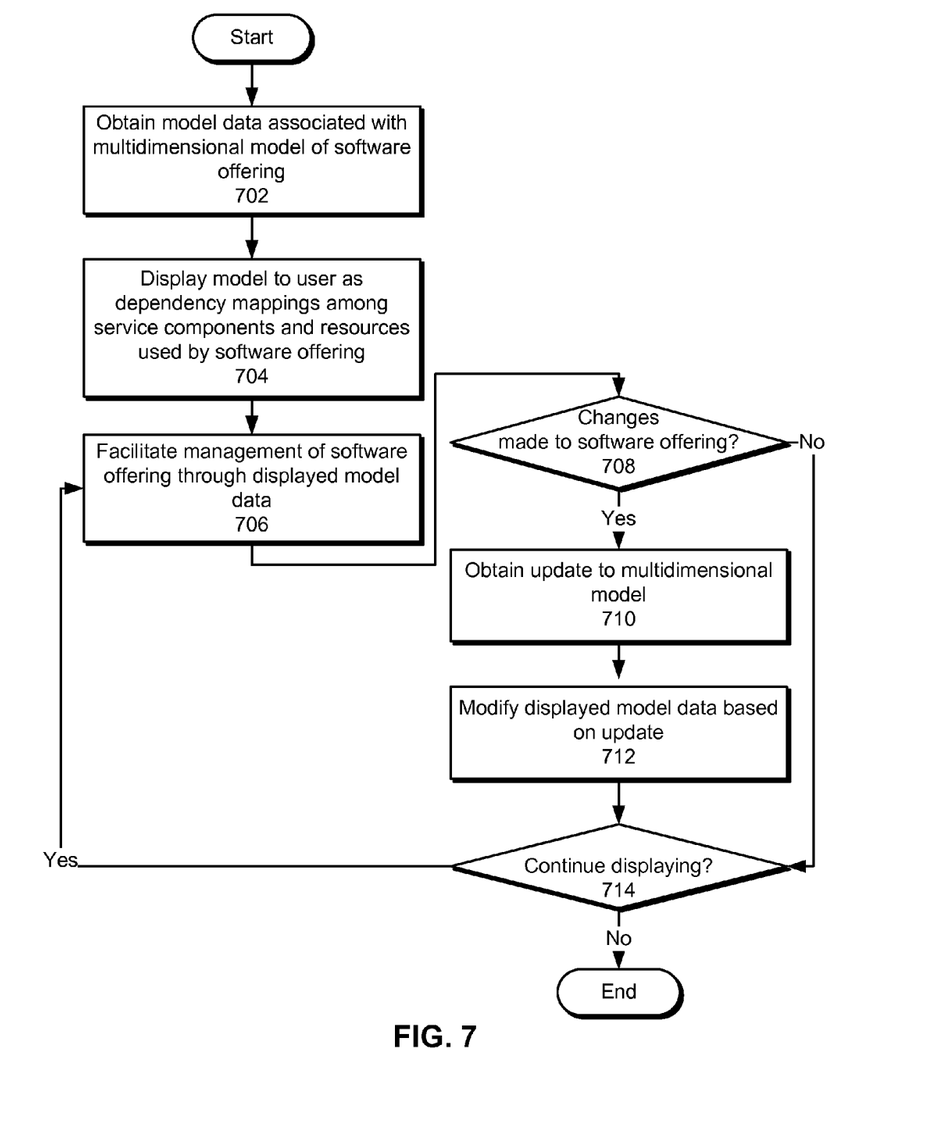
FIG. 7 shows a flowchart illustrating the process of facilitating the maintenance and execution of a software offering in accordance with an embodiment.

FIG. 7 shows a flowchart illustrating the process of facilitating the maintenance and execution of a software offering in accordance with an embodiment. In one or more embodiments, one or more of the steps may be omitted, repeated, and/or performed in a different order. Accordingly, the specific arrangement of steps shown in FIG. 7 should not be construed as limiting the scope of the technique.

Initially, model data associated with a multidimensional model of the software offering is obtained (operation 702). The model data may be provided by a modeling apparatus, such as modeling apparatus 104 of FIG. 1. Next, the model data is displayed to a user as a set of dependency mappings among a set of service components and a set of resources used by the software offering (operation 704). For example, the model data may be displayed using a graph and/or a tree.

Management of the software offering is also facilitated through the displayed model data (operation 706). For example, multiple views of the model data may be provided to the user to improve the user's understanding of dependencies in the software offering. Fault diagnosis may also be facilitated using the displayed data by indicating faults associated with the software offering within the displayed model data and enabling traversal of the dependency mappings along the indicated faults.

Changes may also be made to the software offering during display of the model data (operation 708). For example, service containers in the software offering may change in number, size, and/or location in response to changes in the software offering's policies and/or the availability of the resources. If changes have not been made to the software offering, the displayed model data is not modified.

On the other hand, if changes have been made to the software offering, an update to the multidimensional model is obtained (operation 710), and the displayed model data is modified based on the update (operation 712). For example, the displayed model data may be color-coded based on the recentness of changes to the software offering. A node may be color-coded red to represent a new (e.g., less than 24 hours old) change in the corresponding service component and/or resource, yellow to represent a moderately recent change (e.g., between 24 hours and a week old), and green to represent a change that is more than a week old.

The model data may continue to be displayed (operation 714). For example, the model data may be displayed to the user as long as the user interacts with a GUI within which the model data is displayed. If the model data is to be displayed, the displayed model data is used to facilitate management of the software offering (operation 706), and changes to the software offering (operation 708) are reflected in the displayed model data (operations 710-712). The model data may thus allow the user to manage the software offering using an up-to-date representation of service components, resources, and dependencies in the software offering.

Figure 8:
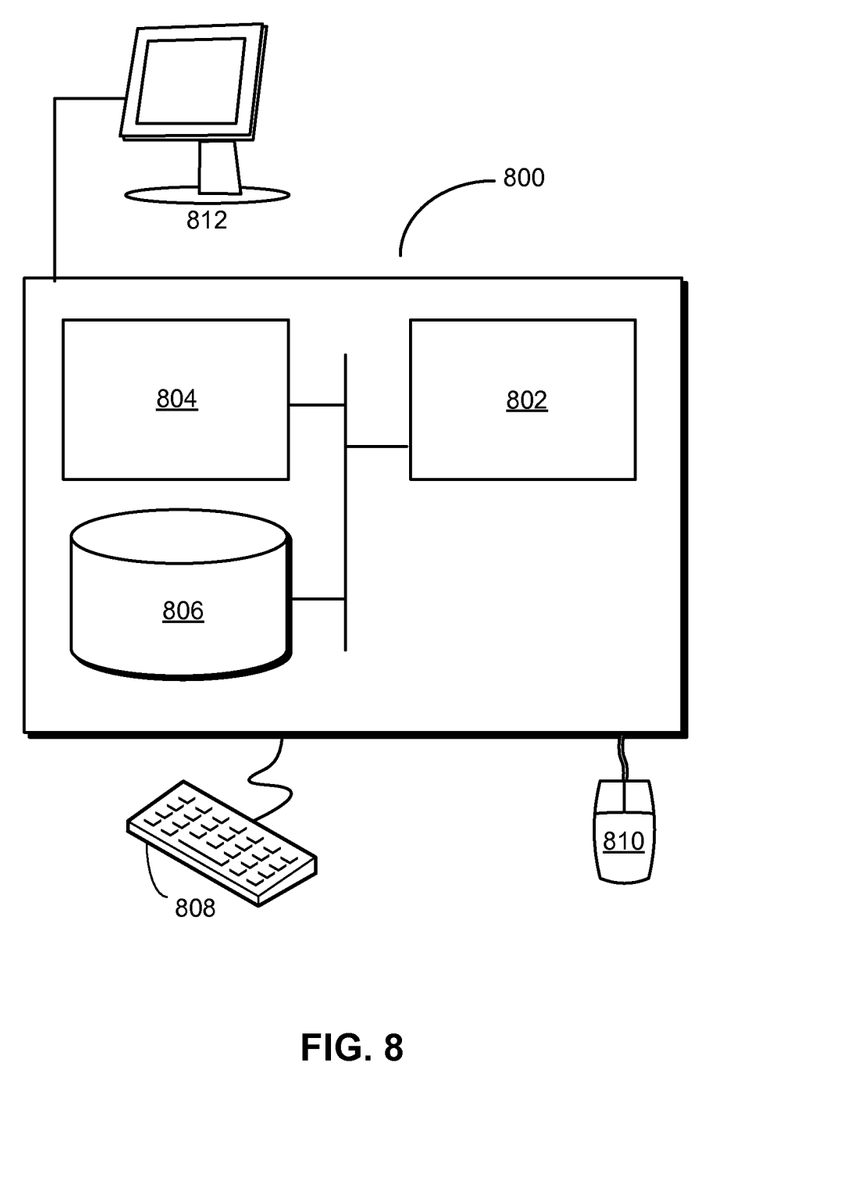
FIG. 8 shows a computer system in accordance with an embodiment.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for facilitating the maintenance and execution of a software offering. The system may include a modeling apparatus that provides model data associated with a multidimensional model of the software offering. The system may also include a management apparatus that displays the model data to a user as a set of dependency mappings among a set of service components and a set of resources used by the software offering and facilitates management of the software offering through the displayed model data.

In addition, one or more components of computer system 800 may be remotely located and connected to the other components over a network. Portions of the present embodiments (e.g., modeling apparatus, management apparatus, etc.) may also be located on different nodes of a distributed system that implements the embodiments. For example, the present embodiments may be implemented using a cloud computing system that manages the deployment, execution, and maintenance of a software offering.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the maintenance and execution of a software offering, comprising:
    obtaining model data associated with a multidimensional model of the software offering, wherein the model data includes a set of dependency mappings among a set of service components and a set of resources used by the software offering;
    displaying the model data to a user by using a graph, wherein the graph comprises a set of nodes representing the service components and the resources, and a set of connections corresponding to the dependency mappings;
    displaying the model data using a tree that comprises a root node and a hierarchy of subnodes corresponding to dependencies of the root node, wherein displaying the model data comprises indicating, within the tree, an event that affects the software offering by indicating every node in the set of subnodes that is affected by the event, the event comprising at least one of a hardware outage and scheduled hardware maintenance;
    receiving a selection of a level of dependency, wherein the level of dependency represents the number of dependency mappings separating a root node from another node in the displayed graph of the model data;
    generating a display of the model data based on the received selection of the level of dependency; and
    facilitating management of the software offering through the displayed model data.

2. The computer-implemented method of claim 1, further comprising:
    obtaining an update to the multidimensional model; and
    modifying the model data displayed using at least one of the graph and the tree based on the update.

3. The computer-implemented method of claim 1, wherein displaying the model data using the tree comprises additionally displaying the model data using the tree.

4. The computer-implemented method of claim 1, wherein facilitating management of the software offering through the displayed model data involves at least one of:
    providing multiple views of the model data to the user; and
    facilitating fault diagnosis using the displayed model data.

5. The computer-implemented method of claim 4, wherein providing multiple views of the model data to the user involves at least one of:
    displaying multiple levels of dependencies among the service components and the resources;
    applying one or more filters to the displayed model data; and
    enabling display of the dependency mappings around different root nodes.

6. The computer-implemented method of claim 4, wherein facilitating fault diagnosis using the displayed model data involves:
    indicating faults associated with the software offering within the displayed model data; and
    enabling traversal of the dependency mappings along the indicated faults.

7. A system for facilitating the maintenance and execution of a software offering, comprising:
    a processor;
    a modeling apparatus coupled to the processor and configured to provide model data associated with a multidimensional model of the software offering, wherein the model data includes a set of dependency mappings among a set of service components and a set of resources used by the software offering; and
    a management apparatus coupled to the processor and configured to:
        display the model data to a user by using a graph, wherein the graph comprises a set of nodes representing the service components and the resources, and a set of connections corresponding to the dependency mappings;
        displaying the model data using a tree that comprises a root node and a hierarchy of subnodes corresponding to dependencies of the root node, wherein displaying the model data comprises indicating, within the tree, an event that affects the software offering by indicating every node in the set of subnodes that is affected by the event, the event comprising at least one of a hardware outage and scheduled hardware maintenance;

receive a selection of a level of dependency, wherein the level of dependency represents the number of dependency mappings separating a root node from another node in the displayed graph of the model data;

generate a display of the model data based on the received selection of the level of dependency; and facilitate management of the software offering through the displayed model data.

8. The system of claim 7, wherein the modeling apparatus is further configured to provide an update to the multidimensional model, and wherein the management apparatus is further configured to modify the model data displayed using at least one of the graph and the tree based on the update.

9. The system of claim 7, wherein the model data is displayed using the tree in addition to being displayed using the graph.

10. The system of claim 7, wherein facilitating management of the software offering through the displayed model data involves at least one of:

providing multiple views of the model data to the user; and facilitating fault diagnosis using the displayed model data.

11. The system of claim 10, wherein providing multiple views of the model data to the user involves at least one of:

displaying multiple levels of dependencies among the service components and the resources;

applying one or more filters to the displayed model data; and enabling display of the dependency mappings around different root nodes.

12. The system of claim 10, wherein facilitating fault diagnosis using the displayed model data involves:

indicating faults associated with the software offering within the displayed model data; and enabling traversal of the dependency mappings along the indicated faults.

13. A non-transitory computer-readable storage medium storing instructions that when executed by a computer cause the computer to perform a method for facilitating the maintenance and execution of a software offering, the method comprising:

obtaining model data associated with a multidimensional model of the software offering, wherein the model data includes a set of dependency mappings among a set of service components and a set of resources used by the software offering;

displaying the model data to a user by using a graph, wherein the graph comprises a set of nodes representing the service components and the resources, and a set of connections corresponding to the dependency mappings;

displaying the model data using a tree that comprises a root node and a hierarchy of subnodes corresponding to dependencies of the root node, wherein displaying the model data comprises indicating, within the tree, an event that affects the software offering by indicating every node in the set of subnodes that is affected by the event, the event comprising at least one of a hardware outage and scheduled hardware maintenance;

receiving a selection of a level of dependency, wherein the level of dependency represents the number of dependency mappings separating a root node from another node in the displayed graph of the model data;

generating a display of the model data based on the received selection of the level of dependency; and facilitating management of the software offering through the displayed model data.

14. The computer-readable storage medium of claim 13, the method further comprising:

obtaining an update to the multidimensional model; and modifying the model data displayed using at least one of the graph and the tree based on the update.

15. The computer-readable storage medium of claim 13, wherein the model data is displayed using the tree in addition to being displayed using the graph.

16. The computer-readable storage medium of claim 13, wherein facilitating management of the software offering through the displayed model data involves at least one of:

providing multiple views of the model data to the user; and facilitating fault diagnosis using the displayed model data.

17. The computer-readable storage medium of claim 16, wherein providing multiple views of the model data to the user involves at least one of:

displaying multiple levels of dependencies among the service components and the resources;

applying one or more filters to the displayed model data; and enabling display of the dependency mappings around different root nodes.

18. The computer-readable storage medium of claim 16, wherein facilitating fault diagnosis using the displayed model data involves:

indicating faults associated with the software offering within the displayed model data; and enabling traversal of the dependency mappings along the indicated faults.

* * * * *